Sept. 25, 1951  P. C. SEAHOLM  2,569,389
PIVOT ASSEMBLY FOR TRACTOR MOUNTED IMPLEMENTS
Filed May 4, 1945  6 Sheets-Sheet 1

Inventor
PAUL C. SEAHOLM
By Carlson + Hagle
Attorneys

Inventor
PAUL C. SEAHOLM
By Carlsen + Hazle
Attorneys

Sept. 25, 1951 P. C. SEAHOLM 2,569,389
PIVOT ASSEMBLY FOR TRACTOR MOUNTED IMPLEMENTS
Filed May 4, 1945 6 Sheets-Sheet 3

Inventor
PAUL C. SEAHOLM
By Carlsen + Hagle
Attorneys

Sept. 25, 1951 P. C. SEAHOLM 2,569,389
PIVOT ASSEMBLY FOR TRACTOR MOUNTED IMPLEMENTS
Filed May 4, 1945 6 Sheets-Sheet 4
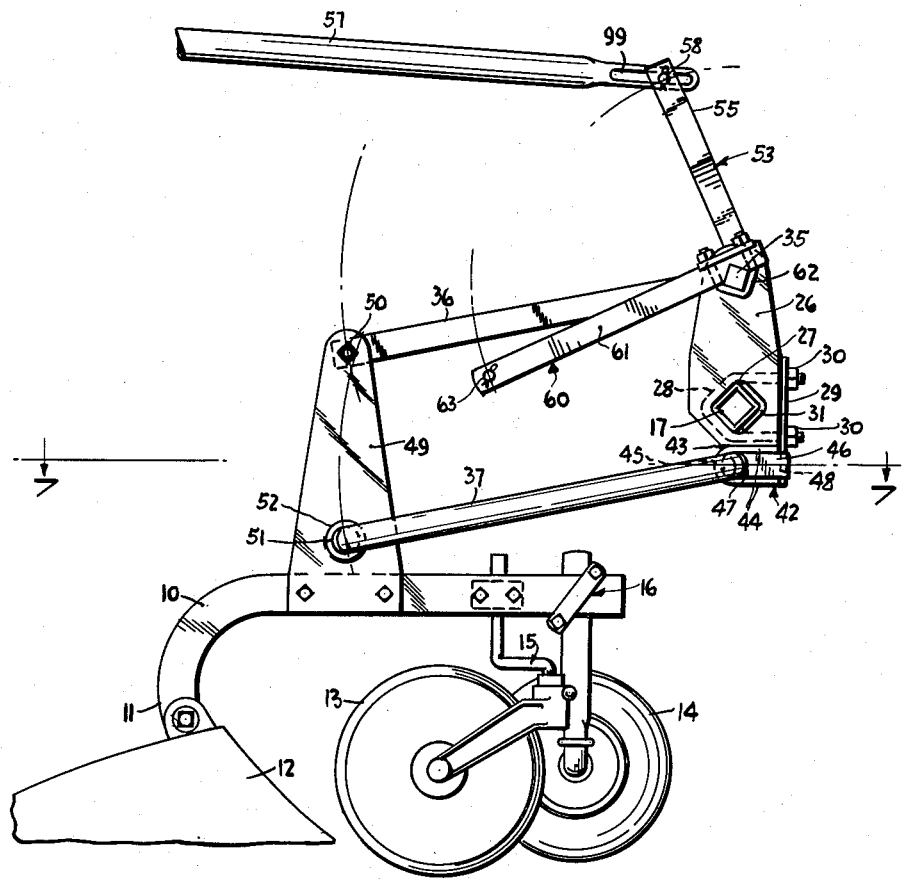
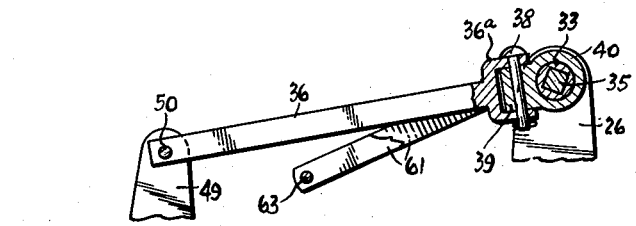
Inventor
PAUL C. SEAHOLM
By Carlsen + Hazle
Attorneys

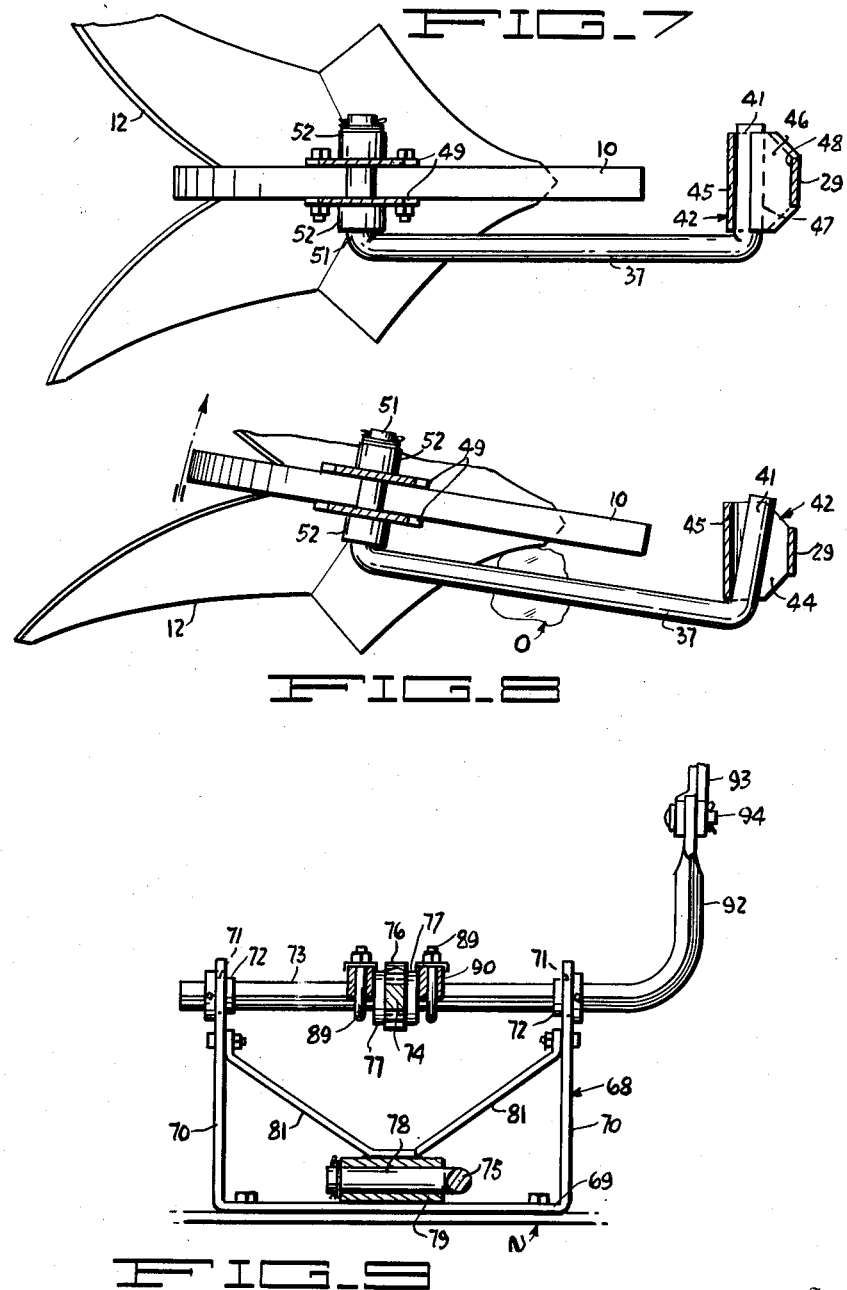

Sept. 25, 1951 P. C. SEAHOLM 2,569,389
PIVOT ASSEMBLY FOR TRACTOR MOUNTED IMPLEMENTS
Filed May 4, 1945 6 Sheets-Sheet 6
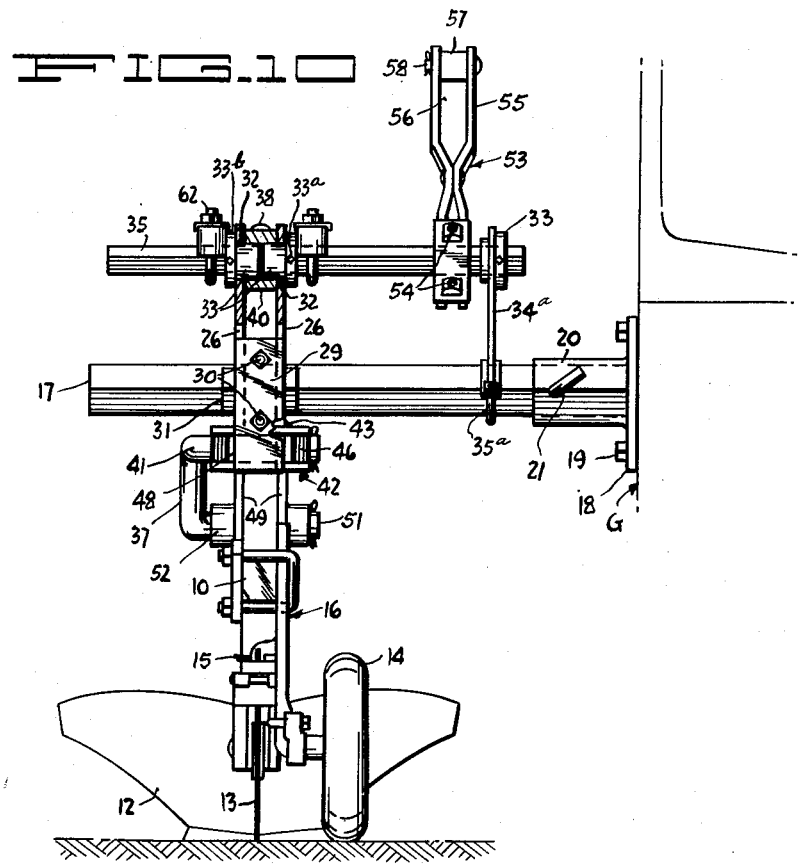
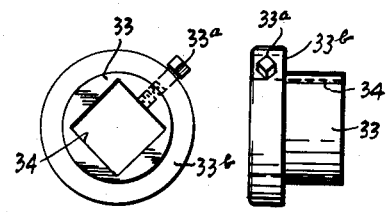
Inventor
PAUL C. SEAHOLM
By Carlsen & Hazle
Attorneys Patented Sept. 25, 1951

2,569,389

UNITED STATES PATENT OFFICE 2,569,389

PIVOT ASSEMBLY FOR TRACTOR
MOUNTED IMPLEMENTS

Paul C. Seaholm, Moline, Ill., assignor, by mesne assignments, to Minneapolis-Moline Company, Hopkins, Minn., a corporation of Minnesota Application May 4, 1945, Serial No. 591,931

6 Claims. (Cl. 97—47)

1

This invention relates generally to improvements in tractor mounted implements and more particularly to that class of tillage equipment known as middle breakers.

The primary object of the invention is to provide a tractor attached or mounted implement assembly having three similar implements or gangs, one at the rear center of the tractor and two spaced apart at opposite forward sides to work in paths spaced outwardly from that traveled by the rear implement, and with means for conveniently mounting, adjusting and operating all of said implements. Another object is to provide an implement mounting wherein the implement is supported for up and down adjustments and movements from working to transport positions, and also selectively adapted for swinging movements in horizontal transverse directions when the nature of the work and soil conditions indicate the desirability of such added movability. A further object is to provide novel and effective lift mechanism for an implement assembly of this character which not only provides for complete flexibility in the various implements or gangs but also provides a delayed lifting action such that, in approaching the end of a row, the front implements will be raised first, and then the rear implement raised later in order to cause all bottoms to leave the ground at substantially the same point. Still a further object is to provide various structural improvements in implements of this nature.

These and other more detailed and specific objects will be disclosed in the course of the following specification, reference being had to the accompanying drawings, in which—

Fig. 5 is an enlarged side elevation of one of the

2 forward implement assemblies and with parts thereof omitted.

Fig. 6 is a fragmentary detail view illustrating the pivot connections for the upper link of the assembly of Fig. 5.

Fig. 7 is a plan view partially in section and taken substantially along the line 7—7 in Fig. 5.

Figures 2, 3:
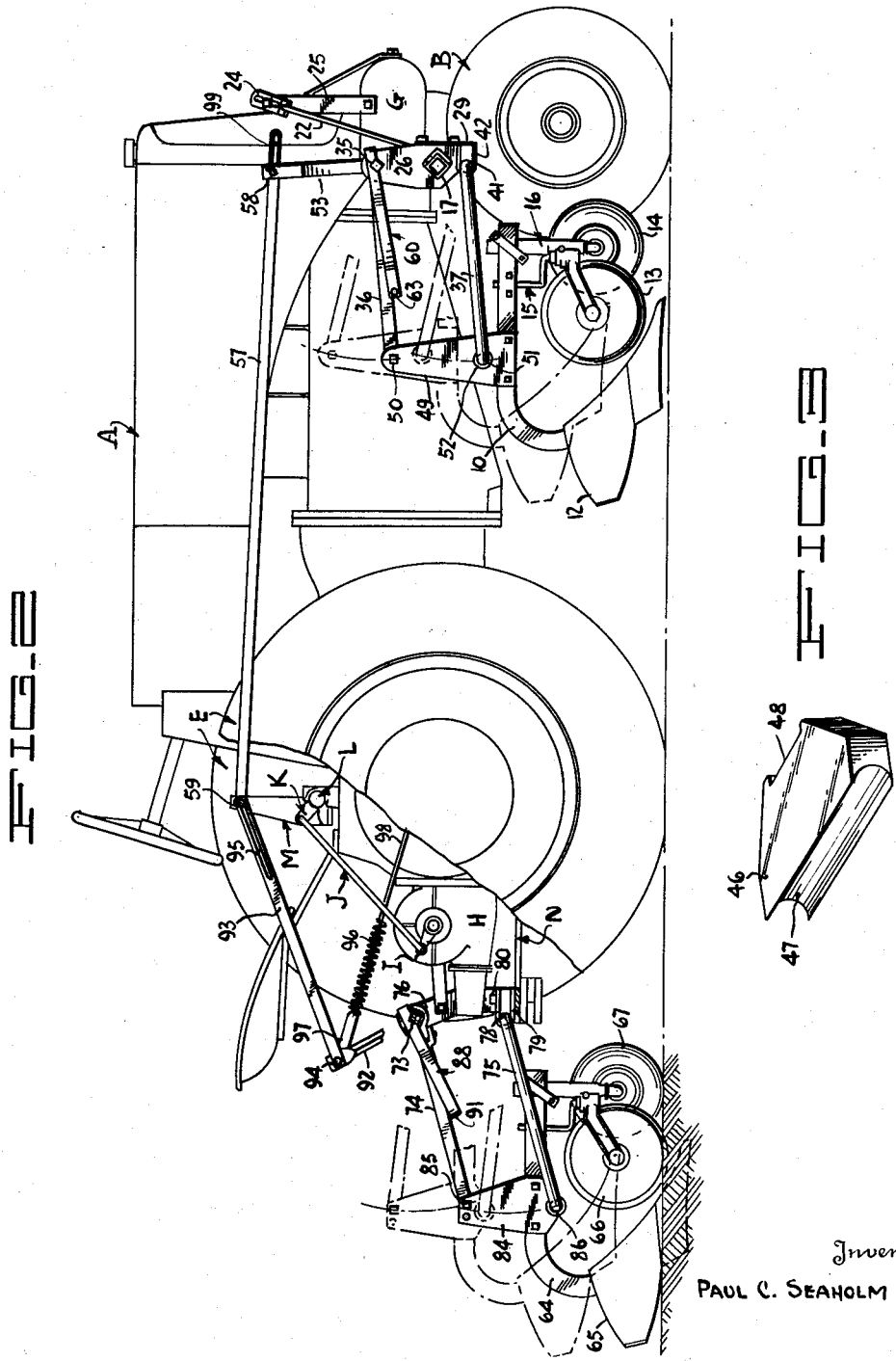
Fig. 2 is a similar view but illustrating the delayed lift action of the front and rear implements, showing the forward implement raised partially to transport position, while the rear implement is yet in the ground, and also showing in broken lines the full transport positions for the front and rear implements.
Fig. 3 is an enlarged perspective view of the removable block or bearing member forming a part of the pivot assembly for the implements.
Figure 4:
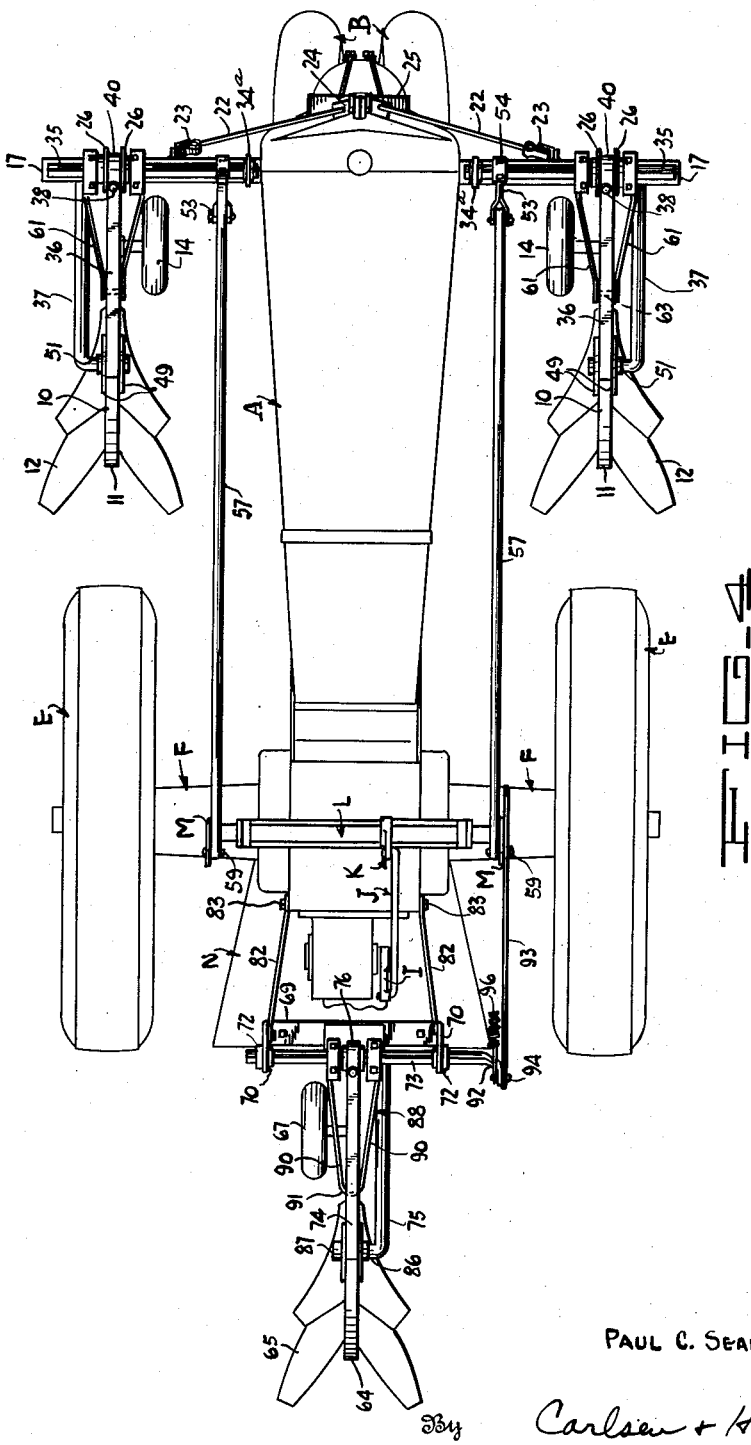
Fig. 4 is a plan view of the structure as shown in Fig. 1 but with the tractor seat and steering mechanism removed.

Fig. 8 is a similar view but illustrating the transverse or lateral swinging movements of the tool or implement when the bearing member or block of Fig. 3 is removed from the pivot connection.

Figure 1:
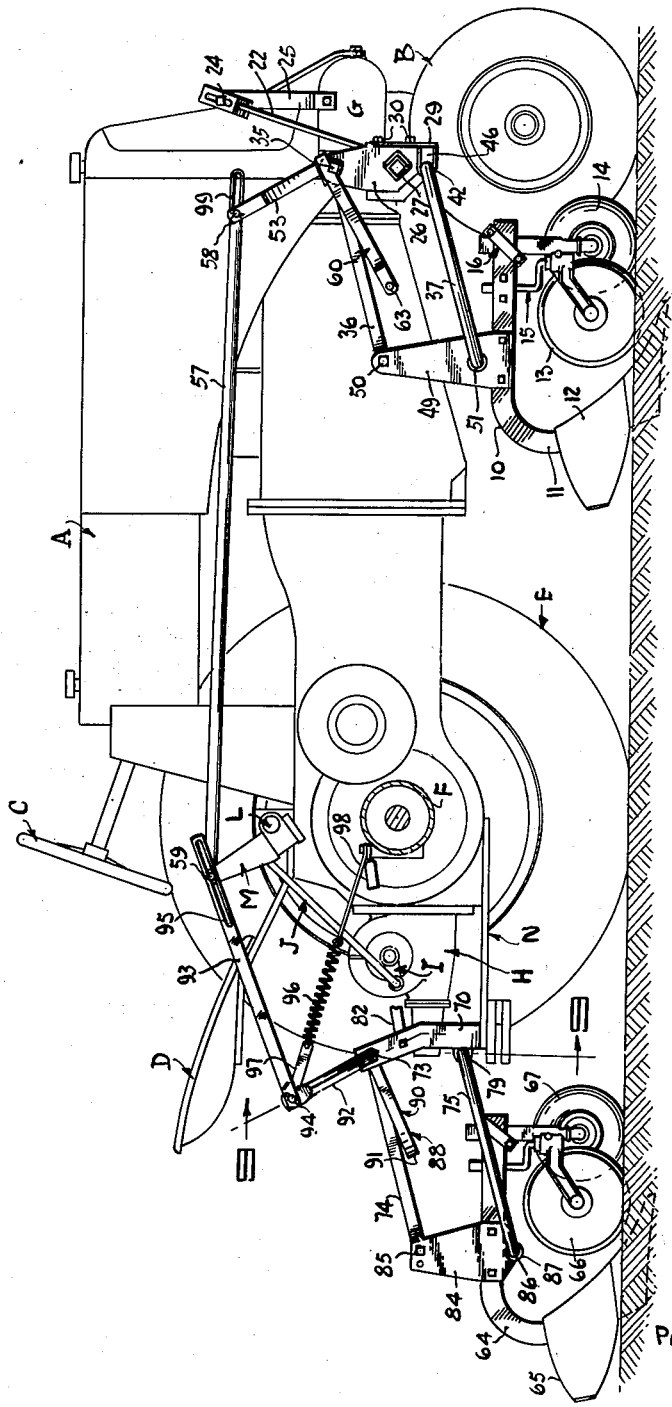
Fig. 1 is a side elevation of my improved middle breaker and tractor assembly showing the implements in working positions and with the rear traction wheel of the tractor removed.

Fig. 9 is an upright cross section through the forward portion of the rear implement taken substantially along the line 9—9 in Fig. 1.

Fig. 10 is a frontal elevation of the forward implement assembly of Fig. 9 and with a part of the pivot connections for the upper link shown in vertical cross section.

Fig. 11 is a composite detail view of one of the bushing members shown in Fig. 10.

Referring now more particularly and by reference characters to the drawing, a conventional type of row crop tractor is illustrated generally at A and it includes the closely spaced front wheels B steerable by a steering wheel C arranged convenient to the operator's seat D, and the power driven rear tractor wheels E which are mounted at the outer ends of axles enclosed with the axle housings F. The tractor further includes a forward casting G to which the forward implements are secured, as will later appear, and at the rear end the tractor has the conventional engine operated power lift device H, including the crank I which is connected by a link J to a lever K upon a transversely journaled lifting roll or shaft L supported above the rear axle structure. At each end of the roll L there is provided a lifting arm M which, in response to operation of the power lift device H and under control of the operator, may be swung forwardly from the position of Fig. 1 in upright longitudinal planes and may be returned to that position when desired.

The forward implements, of which there is one located at each side of the tractor substantially in line with and forwardly of the traction wheel E on that side, are substantially identical in construction and only one will be described in detail herein. As here shown, each implement comprises a tool carrier or beam 10 having a rearwardly and downwardly curving rear end 11 to which the tool may be secured. In the present instance the tool takes the form of a middle breaker plow or bottom 12. Also supported from each tool beam 10 is a coulter disk 13 and a rubber tired gauge wheel 14. The coulter disk 13 is disposed forwardly of the plow bottom 12 in line with the center thereof and is connected to the beam 10 by conventional fittings, indicated generally at 15. The gauge wheel 14 is located forwardly of the disk 13 but is offset inwardly or outwardly from the beam 10, and it is likewise conventionally supported from the beam by the fittings, indicated generally at 16. The gauge wheel is, of course, vertically adjustable to gauge the penetration of the plow bottom in the usual manner.

Disposed forwardly of the implement assembly just described is a frame structure forming a support to which the implement is adjustably attached and this support comprises as its basic element a tool bar or beam 17. As best shown in Fig. 10, this tool bar 17, which is of square tubular or solid construction is supported in laterally out-thrust position from the forward casting G of the tractor, to which it is demountably attached by means of a mounting plate 18 secured by bolts 19 to said casting. The plate 18 has a rigid tubular extension 20 into which the inner end of the tool beam 17 is inserted and removably fastened by a pin 21. The tool beam is thus supported in a horizontal position and the respective beams at each side of the tractor thus mounted are connected by brace rods 22 attached by clips 23 to the beams and extending inwardly therefrom forwardly of the radiator of the tractor. The inner ends of the brace rods 22 are connected at 24 to an upright standard 25 secured to the forward casting G and the position and arrangement of the rods is such that they support the tool beam 17 against downward and rearward movements due to the drag of the implements which are connected to the beams. Affixed to the tool beam 17 outwardly of the tractor is a pair of transversely spaced upright plates 26 which are apertured at 27 to clear the beam 17 and permit their adjustment therealong in a transverse direction with respect to the tractor. A staple bolt 28 is fastened around the beam 17 between the plates 26 and at its forward end is thrust through a retaining plate 29 so that, by drawing up nuts 30 on the bolt ends, against the plate 29 a V-shaped pad 31 carried by and joining the plates 26 may be jammed against the tool beam 17 to lock the assembly in any adjusted position thereon. As best shown in Fig. 5, the plate 29 depends some distance below the plates 26 and the purpose of this arangement will presently appear.

The upper ends of the plates 26 are apertured, as indicated at 32 in Fig. 10, to receive bushings 33 having square openings 34 adapted to fit an upper rock shaft 35 of square cross section. The bushings 33 are secured by set screws 33a to the rock shaft 35 to turn therewith in the apertures 32, and the outer ends of the bushings are diametrically enlarged, as indicated at 33b, at the opposite sides of each of the plates 26. The rock shaft 35 is supported in parallel superimposed relation to the tool beam 17 and its inner end is provided with another identical bushing 33 which turns in the plate 34a secured by staple bolt 35a to the beam adjacent the tubular extension 20 of the fitting mounting the beam on the tractor.

The tool beam 10 is connected to the support assembly above described by upper and lower parallel links, indicated at 36 and 37. As shown in Fig. 6, the upper link 36 is forked at its forward end at 36a and is pivotally attached by a pin 38 to a lug 39 on a bearing member 40. Said bearing member 40 is positioned between the plates 26 and journaled upon the bushings 33 so that the upper link 36 may swing upwardly and downwardly at its rear end, and the pin 38 is so positioned that the link may also swing in transverse or opposite lateral directions at its rear end. The lower link 37 is offset in the transverse direction, outwardly as here shown, with respect to the upper link 36, and at its forward end said lower link has an inwardly turned rounded trunnion portion 41. Said trunnion portion 41 is received in the clip or pivot member 42 welded as indicated at 43 to the lower edges of the plates 26. Said clip has upper and lower flanges 44 joined at their ear end by curved back or bight portion 45 adapted to fit and rotatably engage the rear half of the circumference of the trunnion 41 of the lower link. This pivot or bearing construction is completed by a block or bearing member, indicated generally at 46, adapted to be positioned between the upper and lower flanges of the clip 42 and having a grooved rear edge 47 to fit the forward half of the trunnion member 41. The forward end of the block 46 projects slightly from the clip and is notched, as indicated at 48, to receive the depending lower end of the plate 29 and it is obvious that with the plate in place this engagement between its lower end and the notch 48 will hold the block 46 from displacement in the clip.

The tool beam 10 is provided with rigidly mounted upstanding mounting plates 49 secured to each side, and the rear end of the upper link 36 is received between upper ends of the plates 49 and pivotally attached thereto by a bolt 50. The rear end of the lower link 37 is also provided with an inwardly turned trunnion portion or member 51 which traverses the mounting plates 49 and is rotatably mounted in tubular bearing 52 secured to said plates. The foregoing arrangement is such that the links 36 and 37 may swing upwardly and downwardly at their rear ends to vertically adjust the tool or implement assembly with respect to the supporting frame structure, and the respective pivots for the upper and lower arms are so located that a parallel lever action is obtained to prevent either forward or rear tilting of the implement assembly by such vertical adjustment. It will be noted that the bearing assembly at the forward end of the upper link 36 enables the foregoing movements to occur independently of the position of the rock shaft 35. Said rock shaft 35 is power actuated by means of a lever or arm 53 which is secured adjacent its inner end by staple bolt 54 and which extends upwardly from the rock shaft. The upper end of this arm 53 is bifurcated, as indicated at 55, providing a cleft 56 to slidably receive the forward end of an actuating rod 57. Said actuating rod 57 is connected by a pin 58 to the arm 53 and extends rearwardly therefrom and is connected by pin 59 to the lift arm M. There is, of course, one of such actuating rods at each side of the tractor for the respective forward implements.

Also connected to the rock shaft 35 is a pick-up or lifting yoke indicated generally at 60, comprising spaced side bars 61 disposed one to each side of the upper link 36 and secured at their forward ends to the rock shaft by staple bolts 62. The thus fastened forward ends of the side bars 61 are disposed in wide spread relation at opposite sides of the bushings 33 and from this point the bars converge rearwardly and angle downwardly to a point well beneath the upper link 36. The converging rear ends of the side bars 61 are then connected by a cross pin 63 which is adapted to upwardly contact the upper link 36 responsive to a forward movement of the lever arm 53 and actuating rod 57, as will be readily understood.

The rear implement assembly is essentially like the forward implements and comprises a tool carrier or beam 64 provided with a middle breaker bottom 65, a coulter disk 66 and gauge wheel 67, all arranged exactly as previously described. The support to which the rear implement is connected differs somewhat, however, in that it comprises a substantially U-shaped bracket, indicated generally at 68, having a base portion 69 adapted to be secured across the rear edge of a platform N forming part of the tractor A. The side arms 70 of the bracket 68 extend upwardly and angle slightly rearward from the base portion 69 and upper ends of these arms are apertured, as indicated at 71, to receive bushings 72 by which a rear rock shaft 73 is journaled crosswise in this supporting frame structure. The tool carrier or beam 64 is adjustably supported by upper and lower parallel links 74 and 75 and the upper link 74 is rotatably mounted at its forward end upon the rock shaft 73 by a bearing member 76 which may be identical with that previously described and referred to at 40. Said bearing member 76 is journaled upon bushings 77 upon the rock shaft 73 also in a similar manner to that previously described. The forward end of the lower link 75 is provided with a transversely turned rounded trunnion portion 78 rotatably mounted in a clip or bearing member 79 which is secured, as indicated at 80, to the base portion 69 of the bracket 68. The side arms 70 of this bracket 68 are braced transversely by the brace bars 81, indicated in Fig. 9, and are supported against the rearward pull of the implement by brace bars 82 extending forwardly to points 83 of attachment to the rear housing of the tractor.

The tool beam 64 is also provided with rigidly mounted upright plates 84 between which the rear end of the upper link is received and pivoted upon a bolt 85. Below this point the plates 84 also have bearing members 86 in which a transversely turned trunnion portion 87 of the lower link 75 is rotatably mounted. The foregoing arrangement provides for parallel lever action such that the rear implement may be raised and lowered without tilting it longitudinally.

A pick-up yoke 88 is also provided for the rear implement and has wide spread forward end portions secured by staple bolts 89 to the rock shaft 73, and side bars 90 which converge rearward at each side of the upper link 74. As here shown, the side bars 90 are integrally connected by a cross portion or member 91 positioned below the upper link 74. The rock shaft 73 is power actuated by the lift mechanism of the tractor and for this purpose one end of the rock shaft is turned upwardly, as indicated at 92, forming an arm adapted to be connected by a lifting bar 93 to one of the lift arms M. The rear end of the bar 93 is pivotally attached by pin 94 to the upper end of the rock shaft and the forward end portion of the lifting bar has an elongated slot 95 which receives the pin 59 heretofore described as forming part of the lift arm M. A retractible coil spring 96 is connected by a link 97 to the pin 94 and extends forwardly therefrom to a link rod 98 which is secured to the axle housing F. This spring 96 thus places the rock shaft 73 under tension such that it is rotated in a clockwise direction, as viewed in Fig. 1, and the result of this bias upon the shaft is to hold the pick-up yoke 88 normally and yieldably upward in contact with the upper link 74.

The forward end of the actuating rod 57 for each forward implement is provided with a slot 99 receiving the pin 58.

*Operation*

Referring first to Fig. 1, it will be noted that the several implements will form three furrows equally spaced and with the furrow formed by the rear implement exactly centered with respect to the furrows formed by the forward implements. Furthermore in the working positions of the implements the slot 95 in the rear lifting bar 93 will extend both forwardly and rearwardly of the pin 59 while the slot 99 in the actuating bars 57 will extend forwardly of the pin 58. The arrangement is thus obviously such that all of the implements will have a vertical floating action, independently of the lift mechanism, allowing them to maintain even penetration during the travel of the tractor over uneven ground. In the case of the forward implements, they may move downward without effect upon the lift mechanism due to the fact that the pick-up yokes 60 normally hang below the upper link 36 providing the necessary clearance for such action. In the case of the rear implement such action is provided for, even though the pick-up yoke 88 is held in contact with upper link 74, by the resiliency of the spring 96. The use of this spring at this point is usually made necessary in order to hold the pick-up yoke 90 up out of the way, due to the reduced clearance present in the relatively low mounted support for this implement. The purpose of the slot 99 in the forward ends of the actuating bars 57 is to allow the pick-up yoke 60 to move upwardly should the tractor encounter extremely uneven ground causing either forward implement to raise to a point where such action would be necessary.

To lift the implements to transport position the operator trips the power lift mechanism H and the power of the tractor is then utilized to swing the lift arms M in a forward direction. This action results immediately in a forward thrust upon the actuating rods 57 causing the lever arms 53 to be oscillated in a forward direction, turning the forward rock shafts 35. This movement of the rock shafts is translated to an up swinging movement of the pick-up yokes 60 causing the pins 63 to engage the upper links 36 and swing the entire link structures in an upward direction. As best seen in Fig. 2, however, this initial upward movement of the forward implements will occur prior to any movement at all of the rear implement due to the travel forwardly of the pin 59 in the slot 95 in the rear lift bar 93. In other words, the forward implement will be raised partially to transport position before the pin 59 reaches the forward end of the slot 95, and the rear plow bottom 65 is still forming its furrow. As the pin 59 reaches the forward end of the slot 95, however, the continued forward swinging movement of the lift arm M will pull the bar 93 forwardly to oscillate the rear rock shaft 73 and swing the rear pick-up yoke 90 upwardly. This movement of the rear pick-up yoke will then swing the links 74 and 75 upwardly and at the end of the complete lift both the front and rear implements will have reached transport positions well clear of the ground, as indicated in broken lines in Fig. 2. This so-called delayed lift is advantageous due to the considerable distance longitudinally between the front and rear implements and enables the center furrow to be ended substantially in alignment with the furrows to each side thereof, as each row is completed.

It is frequently desirable, due to the condition of the ground being plowed, to provide transverse flexibility for the implements, and particularly the forward implements. That is, the plow bottoms 12 should be permitted to swing laterally to either side should they encounter an obstacle in the field, such as indicated at O in Fig. 8. When this action is desired the blocks or bearing members 46 are removed from the clips 42 by first removing the trunnions 41 providing clearance so that the blocks may be readily freed from the plates 29 and slipped out from between the flanges 44, after which the trunnions are replaced. It will then be evident, as shown in Fig. 8, that while the rounded rear portions 45 of the clips will so engage the rear of the trunnion members 41 as to provide the necessary up and down pivot action for lower link, the forward clearance provided by removal of the blocks 46 will enable the trunnion members 41 to rock or oscillate in the clips in a generally horizontal and transverse plane. In combination with the substantially upright pivot mountings for the upper link 36 provided by the pins 38, this wobble-jointed arrangement for the lower link enables both links to swing at their rear ends through a limited horizontal transverse arc, and in either direction from their normal trailing positions. The plow bottoms are thus enabled to swing to either side, within a limited range at least, so that their points may clear an obstruction, as will be readily understood. If desired the same arrangement may be provided for the trunnion member 78 of the lower link 75 for the rear implement, although it is not here shown. The rearwardly converging sides of the pick-up yokes 60 and 88 allow the necessary lateral swinging movements of the upper link in this operation, and also serve to center the links and hold the implement assemblies against lateral swinging movements when in transport positions.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In an implement having a support and a tool carrier arranged rearwardly thereof, upper and lower link members pivoted on the carrier and extending forwardly therefrom, the forward ends of the link members being connected to the support for both up and down and lateral swinging movements at their rear ends, and a yoke member swingably supported at its forward end for up and down movements at its rear end and having said rear end arranged beneath one of said links to raise and lower the tool carrier, said yoke member having spaced side portions diverging forwardly and having widespread forward ends to provide clearance for the link as the same swings in lateral directions.

2. In an implement of the character described having a tool beam and a support forward thereof, upper and lower longitudinally extending links pivoted at rear ends to the plow beam, the forward end of the upper link member being pivoted on the support for both up and down and transverse swinging movements at its rear end, and means forming a pivot connection for the forward end of the lower link on the support and having a part normally locking said lower link against all but up and down movements but said part being removable to selectively permit both up and down and transverse movements of the link.

3. In an implement having a tool beam and a support disposed forwardly thereof, the combination comprising upper and lower links arranged longitudinally between the beam and support and pivotally connected on transverse axes at their rear ends to said beam, one link being pivotally connected at its forward end to support for movement about both horizontal and generally upright pivot axes, the other link having a pivot connection on a transverse axis to the support, and means forming a part of said pivot connection for the last mentioned link and removable from said connection to free the link for swinging movements at its forward end about a generally upright axis.

4. In an implement having a tool beam and a support disposed forwardly thereof, the combination comprising upper and lower links arranged longitudinally between the beam and support and pivotally connected on transverse axes at their rear ends to said beam, one link being pivotally connected at its forward end to the support for movement about both horizontal and generally upright pivot axes, the other link having a trunnion member at its forward end and means forming a pivot connection for said trunnion member permitting up and down movements of the rear end of said link, said pivot connection means including a member disposed forwardly of and forming a part of a bearing for the trunnion member and removable to permit rocking movements of the trunnion member and transverse swinging movements of the rear end of the link connected thereto.

5. In an implement having a tool beam and a support forward thereof, at least one link pivotally connected at its rear end to the beam and having a trunnion member at its forward end, a clip member attached to said support and embracing the rear of the trunnion member, a block in said clip member and positioned against the forward side of the trunnion member to complete a bearing therefor about which the link may swing in up and down directions at its rear end, and said block being removable to provide space in said clip within which said trunnion member may oscillate to also permit transverse swinging movements at its rear end.

6. In an implement having a support, upper and lower link members extending rearwardly from the support and pivoted at their forward ends thereto for up and down swinging movements at their rear ends, a tool carrier connected to the rear ends of the link members for up and down adjustments thereby, a pick-up member extending rearwardly from the support and pivoted at its forward end to the support on an axis common to the pivot of one of said link members and adapted at its rear end to upwardly engage that link member, means for swinging the pick-up member upwardly and downwardly at its rear end to raise and lower the tool carrier, the said link members being also pivoted at forward ends for swinging movements in transverse planes at their rear ends, and the pick-up member having forwardly diverging side portions forming widespread forward ends to permit said transverse swinging movements of the link members.

PAUL C. SEAHOLM.

REFERENCES CITED

The following references are of record in the file of this patent:

UNITED STATES PATENTS

| Number | Name | Date |
| --- | --- | --- |
| 903,117 | Waterman | Nov. 3, 1908 |
| 906,140 | Johnson | Dec. 8, 1908 |
| 1,529,641 | Hennen | Mar. 10, 1925 |
| 1,916,945 | Ferguson | July 4, 1933 |
| 2,264,575 | Knapp et al. | Dec. 2, 1941 |
| 2,297,301 | Hipple | Sept. 29, 1942 |
| 2,324,840 | Hipple | July 20, 1943 |
| 2,357,847 | Ray | Sept. 12, 1944 |
| 2,358,539 | Smith | Sept. 19, 1944 |
| 2,362,578 | Mott | Nov. 14, 1944 |